United States Patent
Agrawal et al.

(10) Patent No.: US 7,505,621 B1
(45) Date of Patent: Mar. 17, 2009

(54) DEMOGRAPHIC CLASSIFICATION USING IMAGE COMPONENTS

(75) Inventors: Pyush Agrawal, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 922 days.

(21) Appl. No.: 10/972,316

(22) Filed: Oct. 22, 2004

Related U.S. Application Data

(60) Provisional application No. 60/514,094, filed on Oct. 24, 2003.

(51) Int. Cl.
*G06K 9/62* (2006.01)
*G06K 9/46* (2006.01)
*G06K 9/68* (2006.01)

(52) U.S. Cl. ............... 382/159; 382/118; 382/190; 382/226

(58) Field of Classification Search ............... 382/118, 382/224, 159, 226, 227; 707/1–10
See application file for complete search history.

(56) References Cited

U.S. PATENT DOCUMENTS

| | | | | |
|---|---|---|---|---|
| 5,781,650 | A | 7/1998 | Lobo et al. | 382/118 |
| 6,421,463 | B1 | 7/2002 | Poggio et al. | 382/224 |
| 6,661,906 | B1 * | 12/2003 | Kawade et al. | 382/118 |
| 6,801,662 | B1 * | 10/2004 | Owechko et al. | 382/224 |
| 6,879,709 | B2 * | 4/2005 | Tian et al. | 382/118 |
| 6,885,760 | B2 * | 4/2005 | Yamada et al. | 382/118 |
| 6,990,217 | B1 * | 1/2006 | Moghaddam et al. | 382/118 |
| 2001/0036298 | A1 | 11/2001 | Yamada et al. | 382/118 |
| 2002/0052881 | A1 | 5/2002 | Player et al. | 707/104.1 |
| 2002/0102024 | A1 | 8/2002 | Viola et al. | 382/225 |
| 2002/0162031 | A1 * | 10/2002 | Levin et al. | 713/202 |
| 2003/0026483 | A1 | 2/2003 | Perona et al. | 382/203 |
| 2003/0110038 | A1 | 6/2003 | Sharma et al. | 704/270 |

OTHER PUBLICATIONS

U.S. Appl. No. 60/421,717, filed Oct. 2002, Sharma, et al.
U.S. Appl. No. 60/436,933, filed Dec. 2002, Sharma, et al.
Agrawal, P., et al., "Role of image components in gender classification," The Pennsylvania State University, Masters Thesis, Aug. 2003.
Shaknarovich, G., et al., "A unified learning framework for real time face detection & classification," Int'l Conf on Automatic Face and Gesture Recognition, pp. 16-26, May 2002.

(Continued)

*Primary Examiner*—Daniel G Mariam

(57) ABSTRACT

The present invention includes a system and method for automatically extracting the demographic information from images. The system detects the face in an image, locates different components, extracts component features, and then classifies the components to identify the age, gender, or ethnicity of the person(s) in the image. Using components for demographic classification gives better results as compared to currently known techniques. Moreover, the described system and technique can be used to extract demographic information in more robust manner than currently known methods, in environments where high degree of variability in size, shape, color, texture, pose, and occlusion exists. This invention also performs classifier fusion using Data Level fusion and Multi-level classification for fusing results of various component demographic classifiers. Besides use as an automated data collection system wherein given the necessary facial information as the data, the demographic category of the person is determined automatically, the system could also be used for targeting of the advertisements, surveillance, human computer interaction, security enhancements, immersive computer games and improving user interfaces based on demographic information.

12 Claims, 16 Drawing Sheets

OTHER PUBLICATIONS

Mohan, A., et al., "Example-based object detection in images by components," IEEE Transaction Pattern Analysis and Machine Intelligence, vol. 23, No. 4, pp. 349-361, Apr. 2001.

Gutta, S., et al., "Mixture of experts for classification of gender, ethnic origin, and pose of human faces," IEEE Transactions on Neural Networks, vol. 11, No. 4, pp. 948-960, Jul. 2000.

Kwon, Y. H., et al., "Age classification from facial images," Computer Vision and Image Understanding, vol. 74, No. 1, pp. 1-21, Apr. 1999.

Rowley, H. A., et al., "Neural network-based face detection," IEEE Transactions on Pattern Analysis and Machine Intelligence, 20(1), pp. 23-38, Jan. 1998.

Leung, T. K., et al., "Finding faces in cluttered scenes using random labeled graph matching," Proc. of Fifth Int'l Conf on Computer Vision, pp. 637-644, Jun. 1995, Cambridge, MA.

Sun, Z., et al., "Neural-network-based gender classification using genetic search for Eigen-feature selection," IEEE Int'l Joint Conf on Neural Networks, pp. 2433-2438, 2002.

Moghaddam, B., et al., "Gender classification with support vector machines," in Proc. of Fourth IEEE Int'l Conf on Automatic Face and Gesture Recognition, pp. 306-311, 2000.

Colmenarez, A., et al., "Detection and tracking of faces and facial features," IEEE Proc. of Int'l Conf on Image Processing, vol. 1, pp. 657-661, 1999.

Wiskott, L., et al., "Face recognition and gender determination," in Proc. of the Int'l Workshop on Automatic Face- and Gesture-Recognition, pp. 92-97, 1995, Zurich.

\* cited by examiner

DEMOGRAPHIC CLASSIFICATION USING IMAGE COMPONENTS

CROSS-REFERENCE TO RELATED APPLICATIONS

This application is entitled to the benefit of Provisional Patent Application Ser. No. 60/514,094, filed Oct. 24, 2003.

FEDERALLY SPONSORED RESEARCH

Not Applicable

SEQUENCE LISTING OR PROGRAM

Not Applicable

BACKGROUND OF THE INVENTION

1. Field of the Invention

This invention relates generally to image processing systems and more particularly to a system and method for automatic extraction of demographic information (age, gender, or ethnicity) from an image.

2. Background of the Invention

Human faces provide us with a plethora of information that is valuable and necessary for social interaction. When we encounter a face, we can quickly and successfully decide whether it is one we know. For faces of people we know, we can easily retrieve semantic and identity information about the person. Furthermore, from both familiar and unfamiliar faces we can make gender, ethnicity, and age estimation for a person.

Automated collection of demographic information has numerous application and has the potential of not only enhancing the existing HCI system but can also serve as platform for passive surveillance (for e.g., alerting medical authorities if there is a accident in old age home). It can also be used for development of new HCI application (e.g., helping the prospective buyers in choosing a product, or cigarette vending machines based on age verification), immersive computer games (for e.g., changing scenarios and multimedia content based on demographic preferences), collecting retail business information (e.g., the number of women entering a retail store on a given day), image retrieval (for e.g., accessing all images belonging to babies), enhancing identity verification (for e.g., ATM where in real time the demographic information of the user can be verified against a existing database to provide enhanced security), and advertising (for e.g., focusing on a particular demographic group for selling a product).

U.S. Pat. No. 5,781,650 to De Lobo describes an automatic feature detection and age classification method for human face in images. Their automatic age categorization system is based on finding a face in an image and locating the facial features. Using these facial features, distances between them and by performing wrinkle analysis of the skin they categorize the age of the human face in the image. In the paper titled "Age Classification for Facial Images", Young H. Kwon and Niels De Vitoria Lobo, Computer Vision and Image Understanding, 74(1), pp. 1-21, 1991, they used cranio-facial development theory and wrinkle analysis for age classification. In their invention, they did not use components for classifying age and did not have a mechanism for fusion of classifier results. Furthermore, their system cannot be applied in the current form for ethnicity and gender classification.

U.S. Pat No. (Application) 60/421,717 to Sharma describe another method for automatic age category classification based on Support Vector Machines (SVM) where they use full-face image for classification. Their system is not based on facial components for classification purposes.

U.S. Pat. No. (Application) 60/436,933 to Sharma et. al, describes method for classifying human faces images according to ethnicity using SVM. Their system is based on full-face images and does not use facial components for ethnicity classification.

US Pat No. (Application) US 20030110038A1 granted to Sharma et. al, describes a method for Multi-Modal Gender classification. Their method is based on performing gender classification using acoustic signals and face images of the user using statistical classification algorithms. Their method did not use components for gender classification and used full-face images.

U.S. Pat. No. 6,421,463 granted to Poggio et. al, describes a method for detecting human in an image using components. In their method is based on detecting the different human body components using wavelets in an image and classifying these components. The output of these components is fused together to give the final output. In the research paper titled "Example-Based Object Detection in Images by Components", Anuj Mohan, Constantine Papageorgiou, and Tomaso Poggio, IEEE Transaction on Pattern Analysis and Machine Intelligence, 23(4), pp. 349-364, 2001, identified four components namely, head, legs, left arm, and right arm on the basis of wavelet transforms to perform Pedestrian Detection. They did not apply their system or method for demographic classification. Moreover, their invention is based on wavelets transforms for classification. Furthermore, Poggio's patent does not use or does not clarify the classifier fusion mechanism.

US Pat No. US2001/0,036,298 granted to Yamada et. al, describes a classification methodology for detection, recognition, and identification of age and gender using Left and Right Eye and region between the eyes. Their system is restricted only to the eyes and does not include any other component of human body or facial feature for classification.

Patent by Perona et. al, Pat No. (Application) US20030026483A1, describes a method for object detection using features. They used expectation maximization to assess a joint probability of which features are most relevant. Their invention defines a statistical model in which shape variability is modeled in a probabilistic setting. The research paper titled "Finding Faces in Cluttered Scenes using Random Labeled Graph Matching", T. K. Leung, M. C. Burl, and P. Perona, Fifth International Conference on Computer Vision, 1995, identified five features namely left eye, right eye, left nostril, right nostril, and mouth by randomly labeled graph matching algorithm and identified faces using joint probabilistic model of faces. There system is not suited to demographic classification as probabilistic model for any two demographics class are very similar to each other and hence undistinguishable.

Patent granted to Viola, US Pat No. (Application) US20020102024A1, describes a method for object detection using integral image representation of the input image. The object detector uses cascade of homogenous classification functions or classifiers. Their invention defines a fast method for object detection using rectangular components defined by wavelets. The research paper titled "A Unified Learning Framework for Real Time Face Detection & Classification", Gregory Shakhnarovich, Paul Viola, and Baback Moghaddam, International Conference on Automatic Face and Gesture Recognition, 2002, performed demographic classification using integral image. It calculates the integral image rather than classifying on each component and the result is integrated over time. Furthermore, their system is based on wavelets to identify components.

Moghaddam et. al. in "Gender Classification with Support Vector Machines", IEEE International Conference on Automatic and Gesture Recognition, pp. 306-311, 2000, performed gender classification from full face images using Support Vector Machines. They system did not use components for classification. Moreover, they did not show that their system could be applied to Ethnicity and age classification. Gutta et. al, in "Mixture of Experts for Classification of Gender, Ethnic Origin, and Pose of Human Faces", IEEE Transaction on Neural Networks, 11(4), pp. 948-960, 2000, performed gender and ethnicity classification using Radial Basis Function and Inductive Trees. Their system did not use components for classification purpose.

Wiskott et. al, "Face Recognition and Gender Determination", pp. 92-97, 1995, used Elastic Graph Matching on full face images to perform gender classification. They did not use components for classification purpose.

Bebis et. al, "Neural-Network-Based Gender Classification Using Genetic Search for Eigen-Feature Selection", IEEE World Congress on Computational Intelligence, 2002, used Neural Networks, Genetic Algorithms and PCA to do gender classification. They did not use components for gender classification.

Patent granted to Player, US Pat No. (Application) US20020052881A1, shows an example of use of demographic information for customizing computer games and advertising. They did not show any method or system for extracting demographic information from images or videos.

SUMMARY

The present invention defines a method and a system for gathering demographic information (such as ethnicity/gender/age) using image components in a facial image.

In accordance with this invention, demographic information refers to one or more of the age, gender, or ethnicity demographic categories. Furthermore, components refer to an artifact that is one of the individual parts of which a composite entity is made up.

The system according to this invention, comprise of face detector module for identifying the faces within a digital image. The output of face detector module is fed to component detection module. The component detection module comprises of one or more component detectors to identify various components within the face image. Feature extraction is performed on the output of each component detector to extract discriminating features to generate component information. This component information is fed to classifiers to extract demographic information.

The classifier module comprise of fusion classifiers based on Data Level or Hierarchical Fusion model. In data level fusion model, the component information from various components is concatenated in one vector for classification. In hierarchical fusion model, a demographic classifier is made for each of the component information. The output of these component demographic classifiers is cascaded to another classifier, which produces the demographic information.

In this invention, demographic information is generated from the output of demographic category classifiers (such as ethnicity/gender/age). The demographic category classifier generates results by performing demographic sub-category classification (sub-categories such as Caucasian/African American/Oriental for ethnicity category). This invention has at least one demographic category and each category includes at two or more demographic sub-category (such as male/female). In order to improve the accuracy of demographic information, the different demographic category and sub-category classifiers may be arranged in serial/parallel/hybrid organization.

DRAWINGS

Figures

Figure 3:
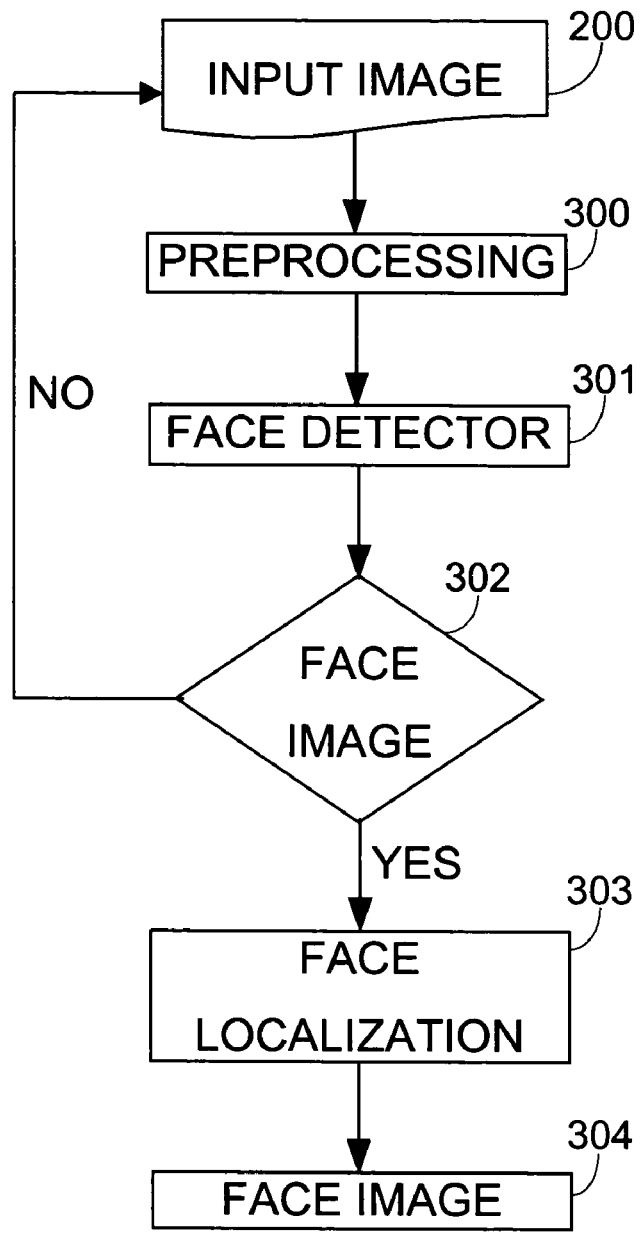

FIG. 3 gives a perspective inside the Face Detection Module. The Face Detection Module receives a still image and localizes on the face region.

Figure 4:
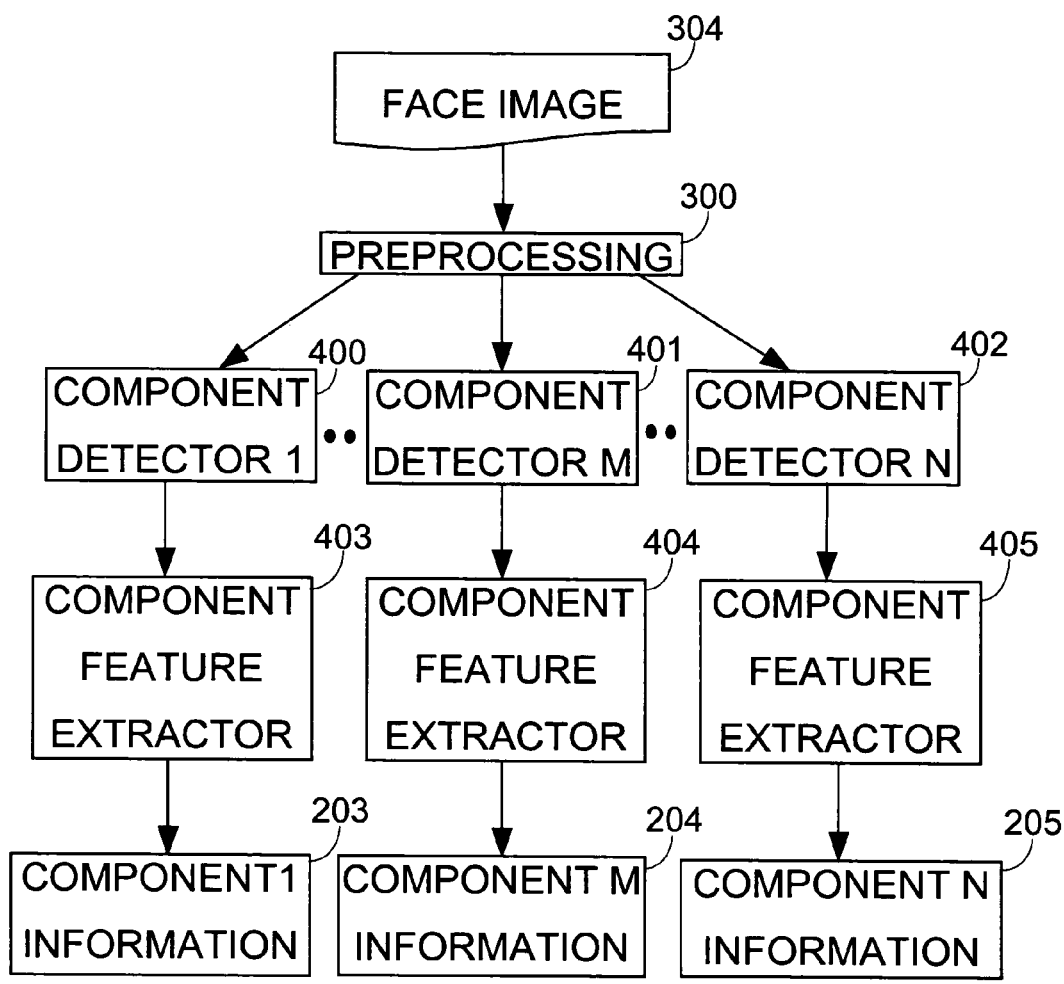

FIG. 4 gives a perspective inside the Component Detection Module. The Component Detection Module receives the face image. It detects and localizes on the various components in the face image.

Figure 5:
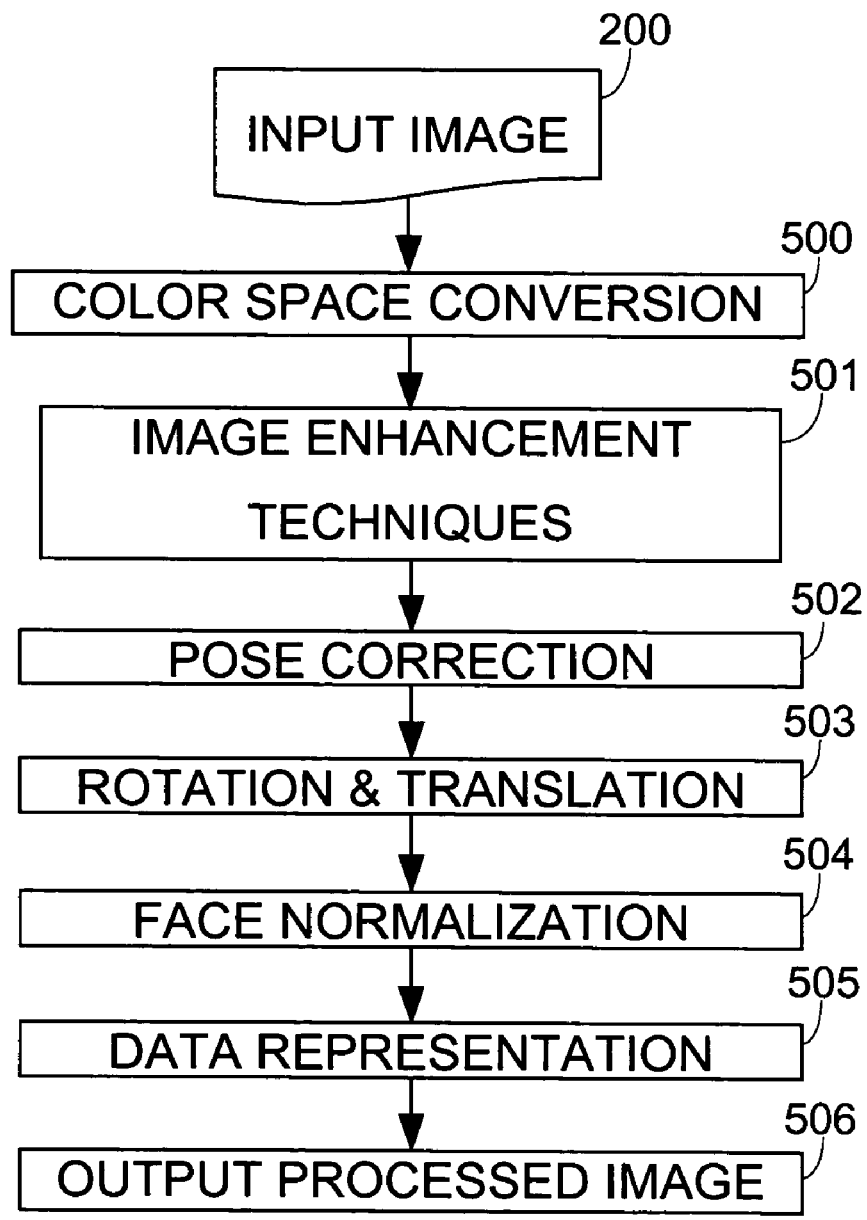

FIG. 5 shows different steps in Preprocessing Module. The Preprocessing Module may comprise of one or more of the blocks shown in the figure.

Figure 6:
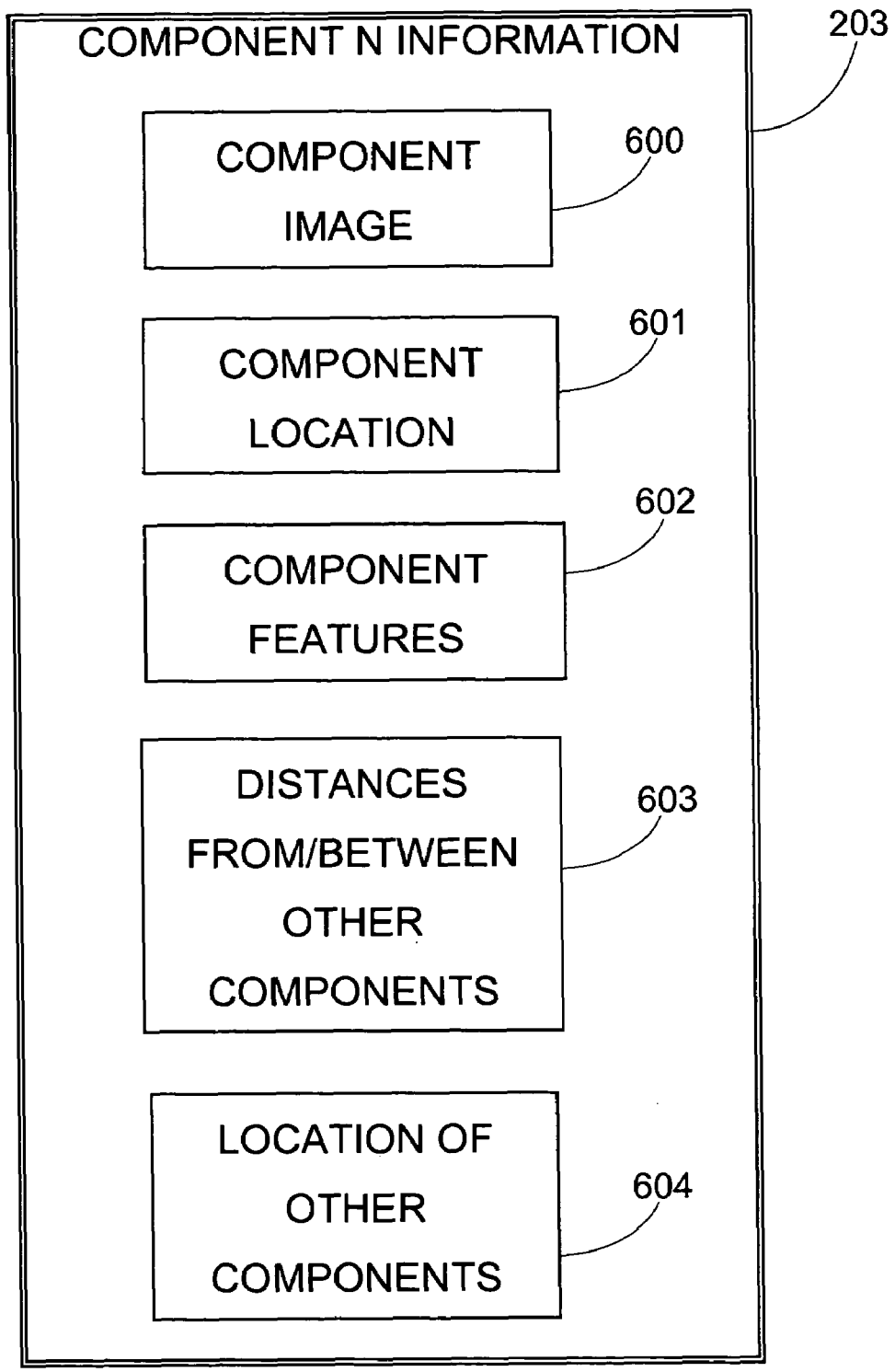

FIG. 6 shows an exemplary embodiment of component information.

Figure 7:
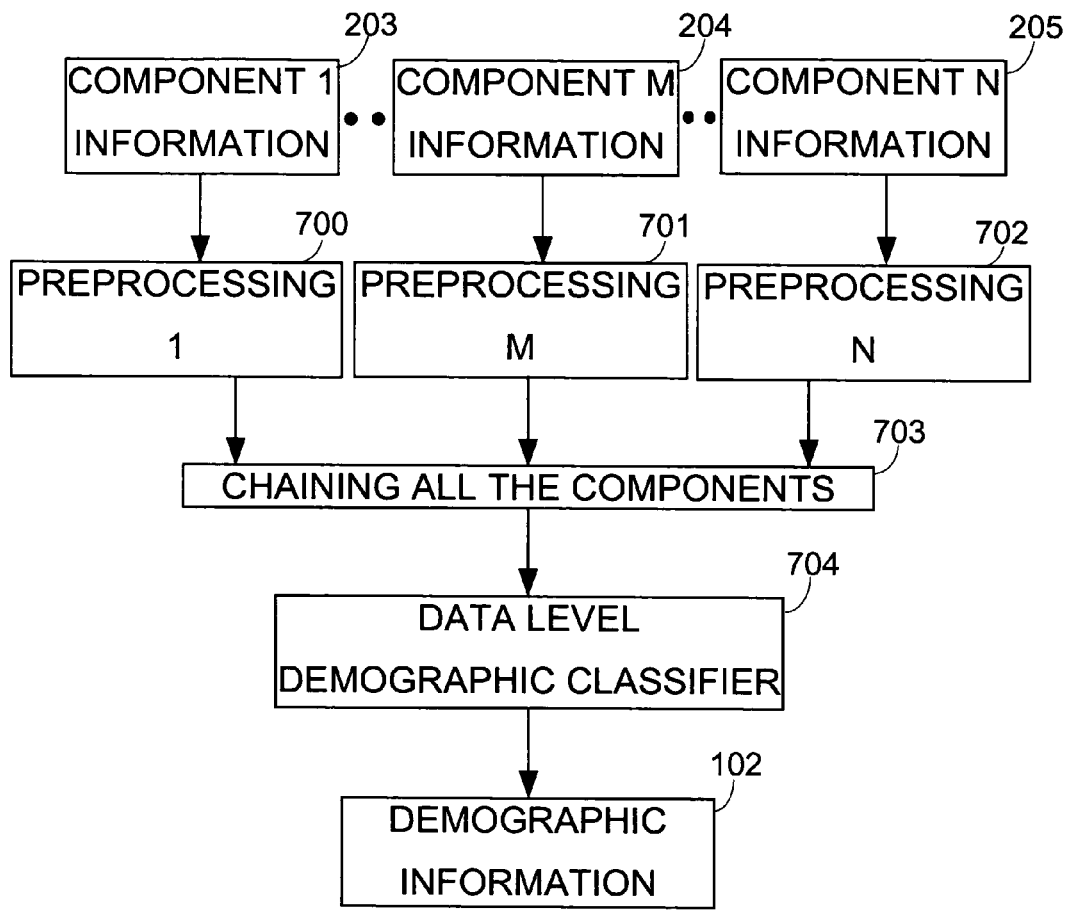

FIG. 7 gives perspective into Data Level Fusion of component information. In this module, the component information from various components is concatenated together to form a single data vector. A Demographic Classifier operates on this data vector to give the Demographic Output.

Figure 8:
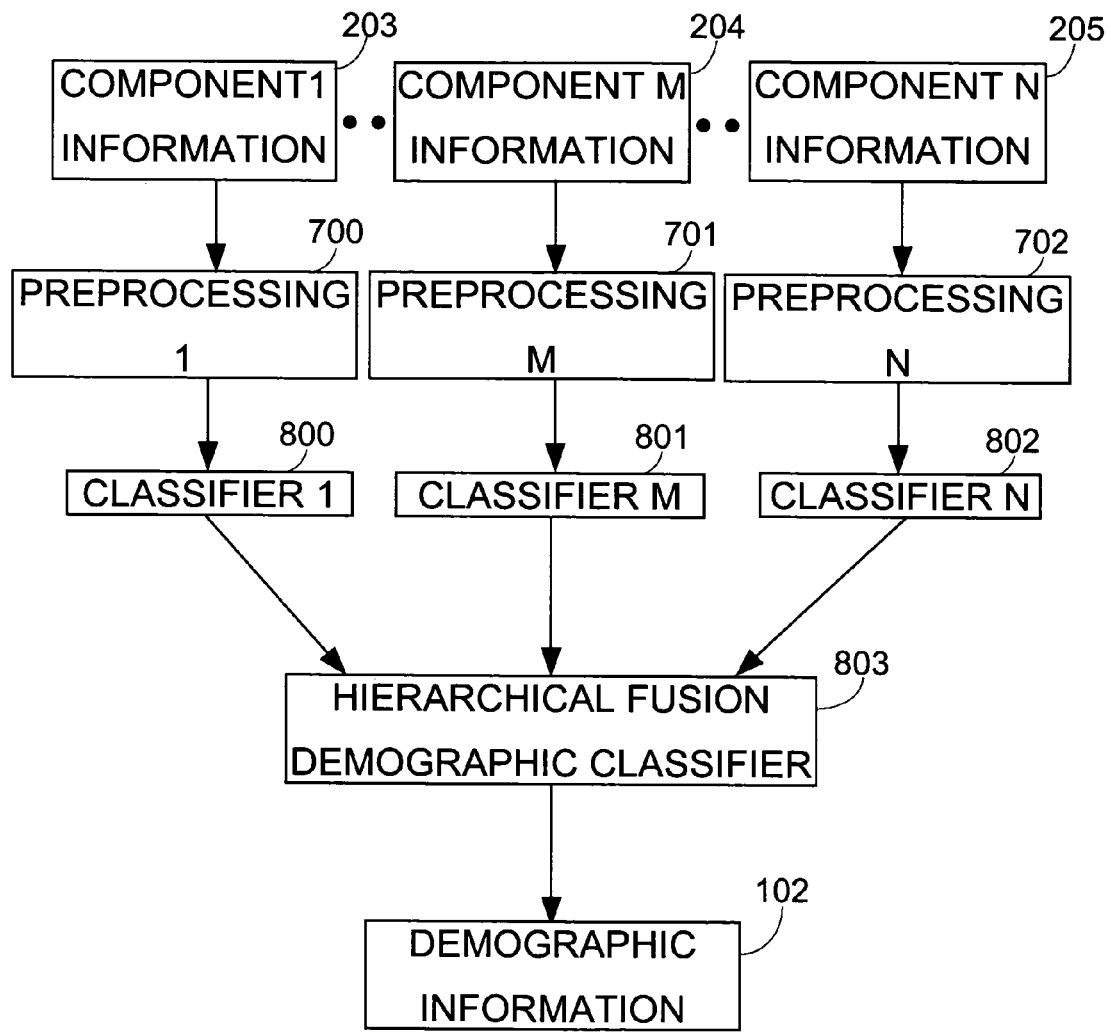

FIG. 8 shows the detailed view of Hierarchical Fusion of classifier for component information. In Hierarchical Classifier, a Sub-Category Demographic Classifier is made for each component. The output of each Component Sub-Category Demographic Classifier is fed to a Fusion Classifier to give the Demographic Output.

Figure 9:
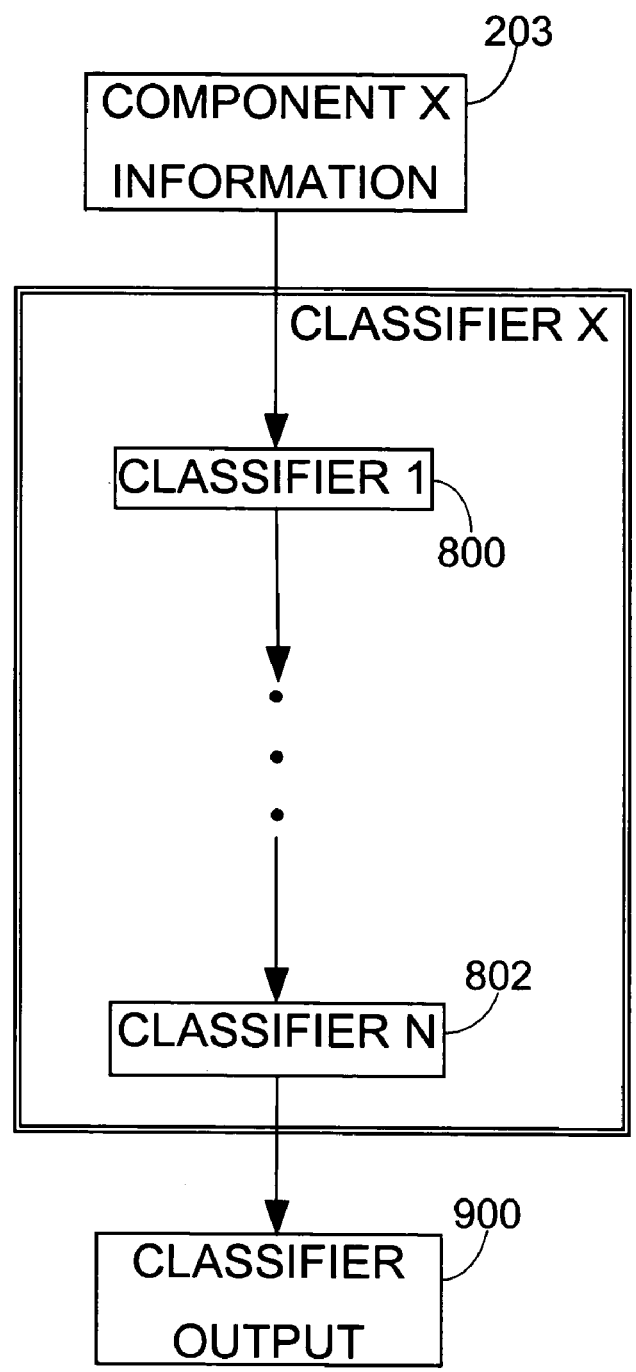

FIG. 9 shows a detailed view Serial Configuration of classifiers for component information. It is used for Sub-Category Demographic Classification (for e.g., two or more sub-categories of Ethnicity).

Figure 10:
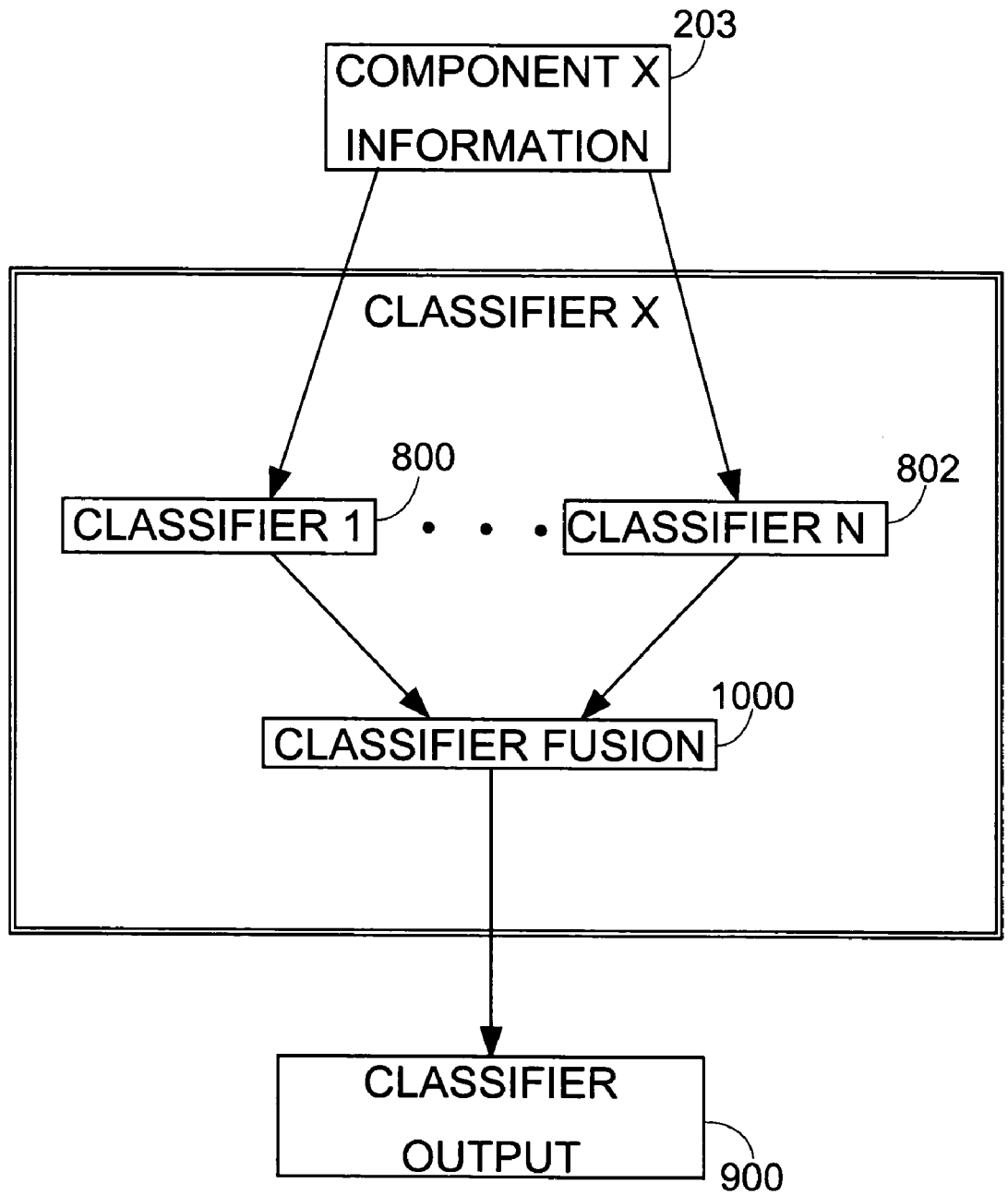

FIG. 10 shows a detailed view of Parallel Configuration of classifiers for component information. It is used for Sub-Category Demographic Classification (for e.g., two or more sub-categories of Ethnicity).

Figure 11:
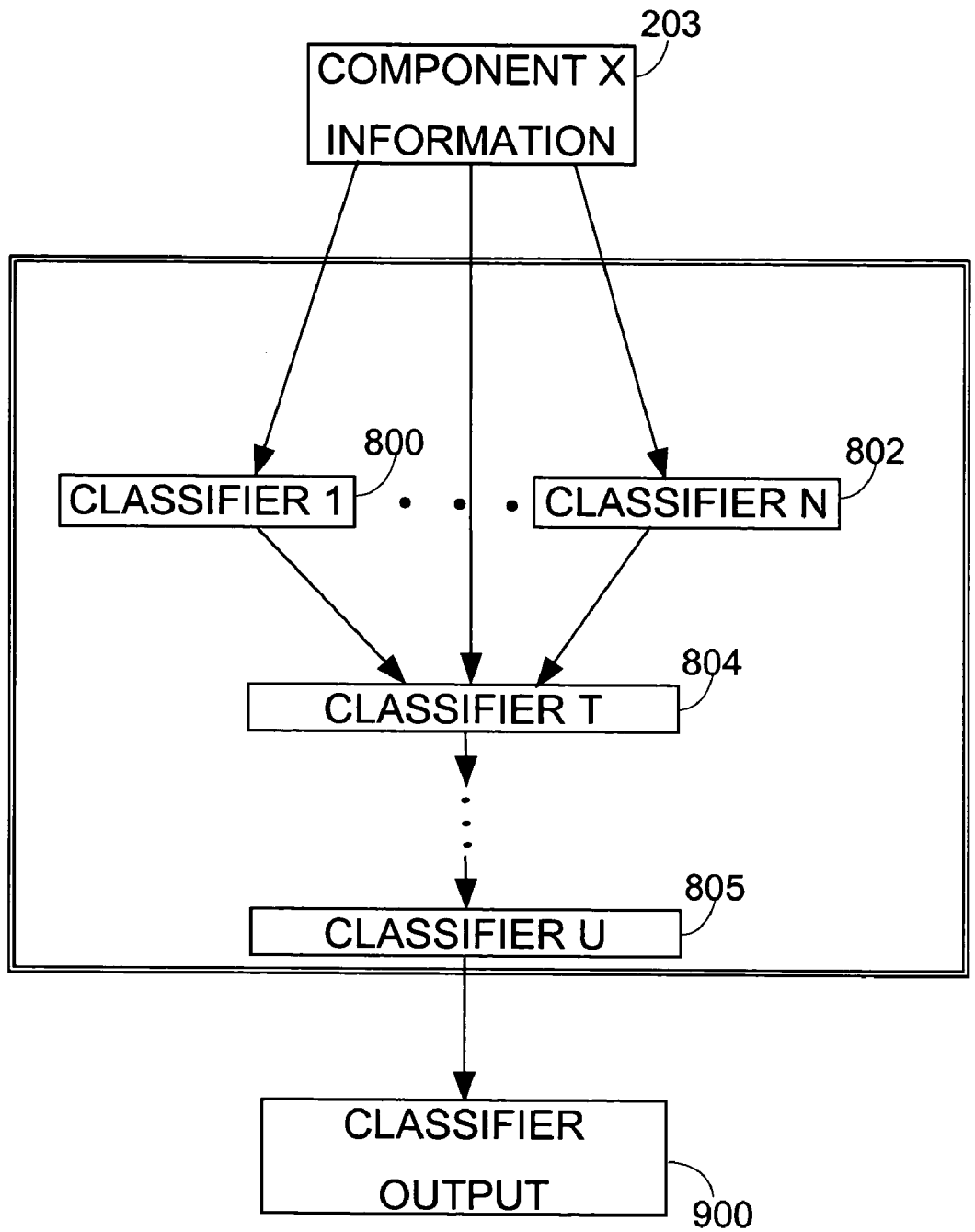

FIG. 11 shows an exemplary embodiment of the Hybrid Configuration of classifiers.

Figure 12:
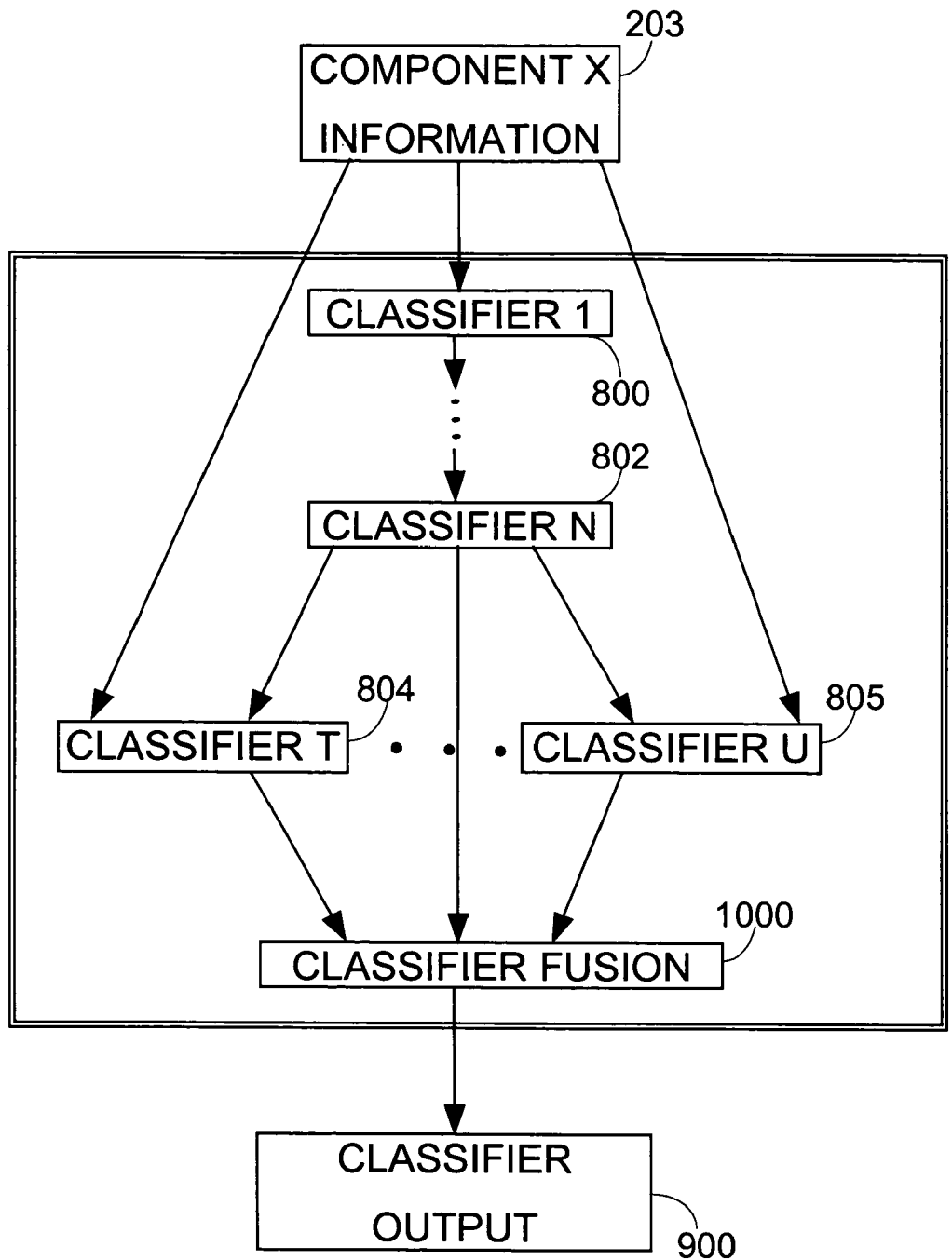

FIG. 12 shows another exemplary embodiment of the Hybrid Configuration of classifiers.

Figure 13:
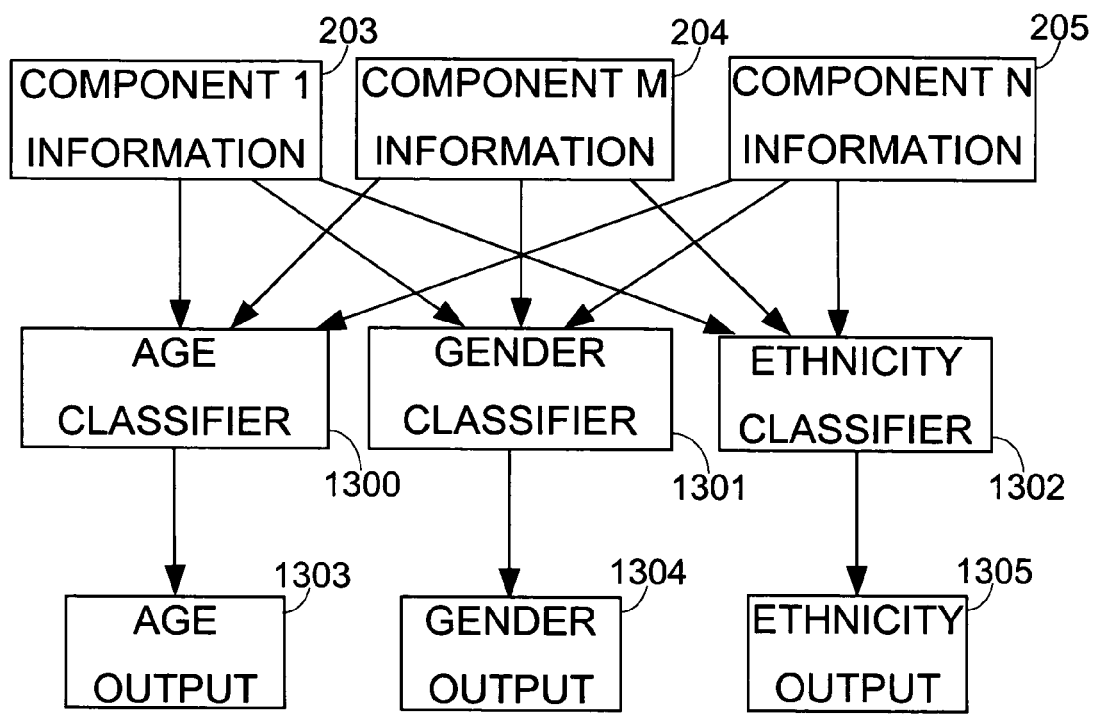

FIG. 13 shows an exemplary embodiment of the Parallel Configuration for multiple Category Demographic Classifiers (for e.g., two or more categories of age, gender, or ethnicity).

Figure 14:
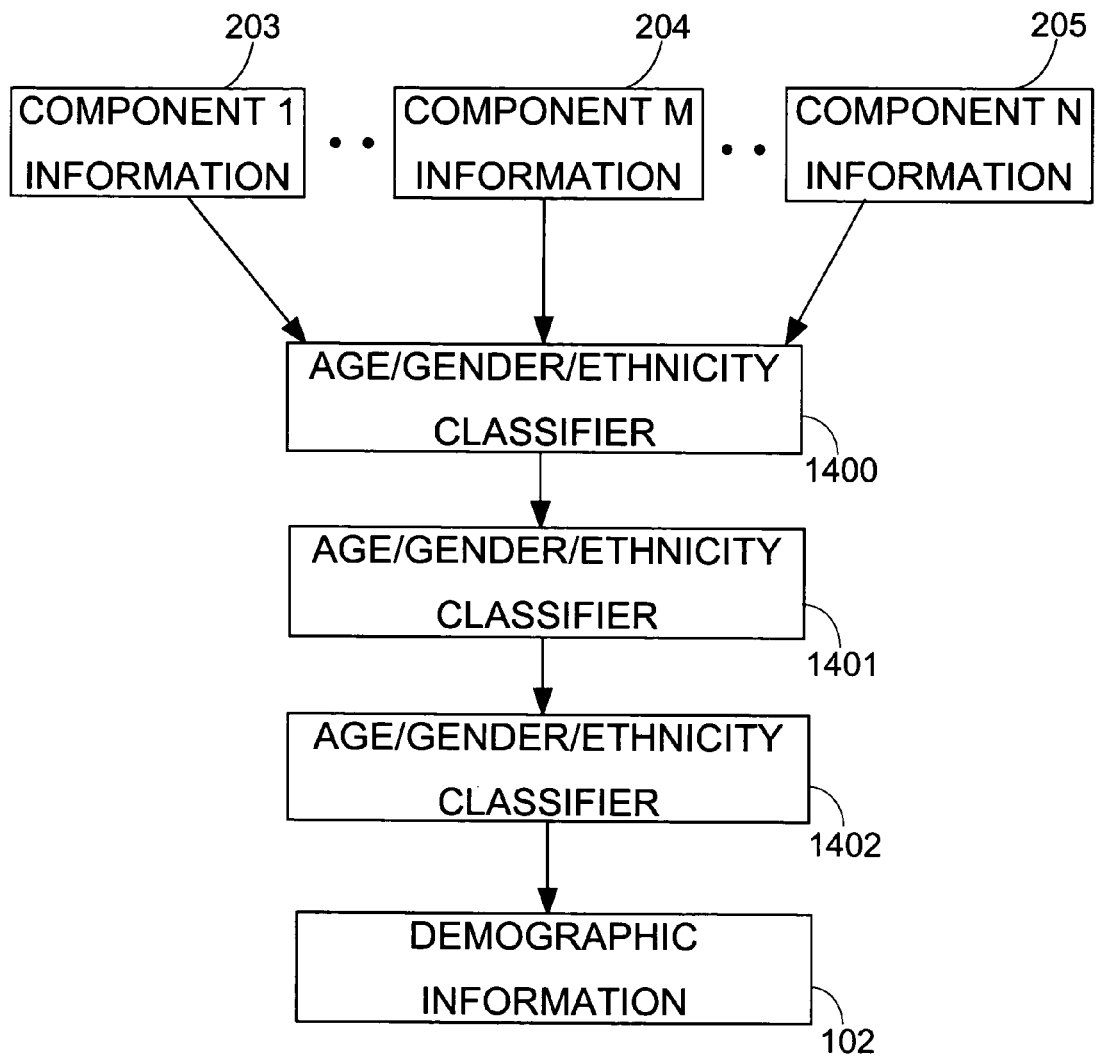

FIG. 14 shows an exemplary embodiment of the Serial Configuration for multiple Category Demographic Classifications (for e.g., two or more categories of age, gender, or ethnicity)

Figure 15:
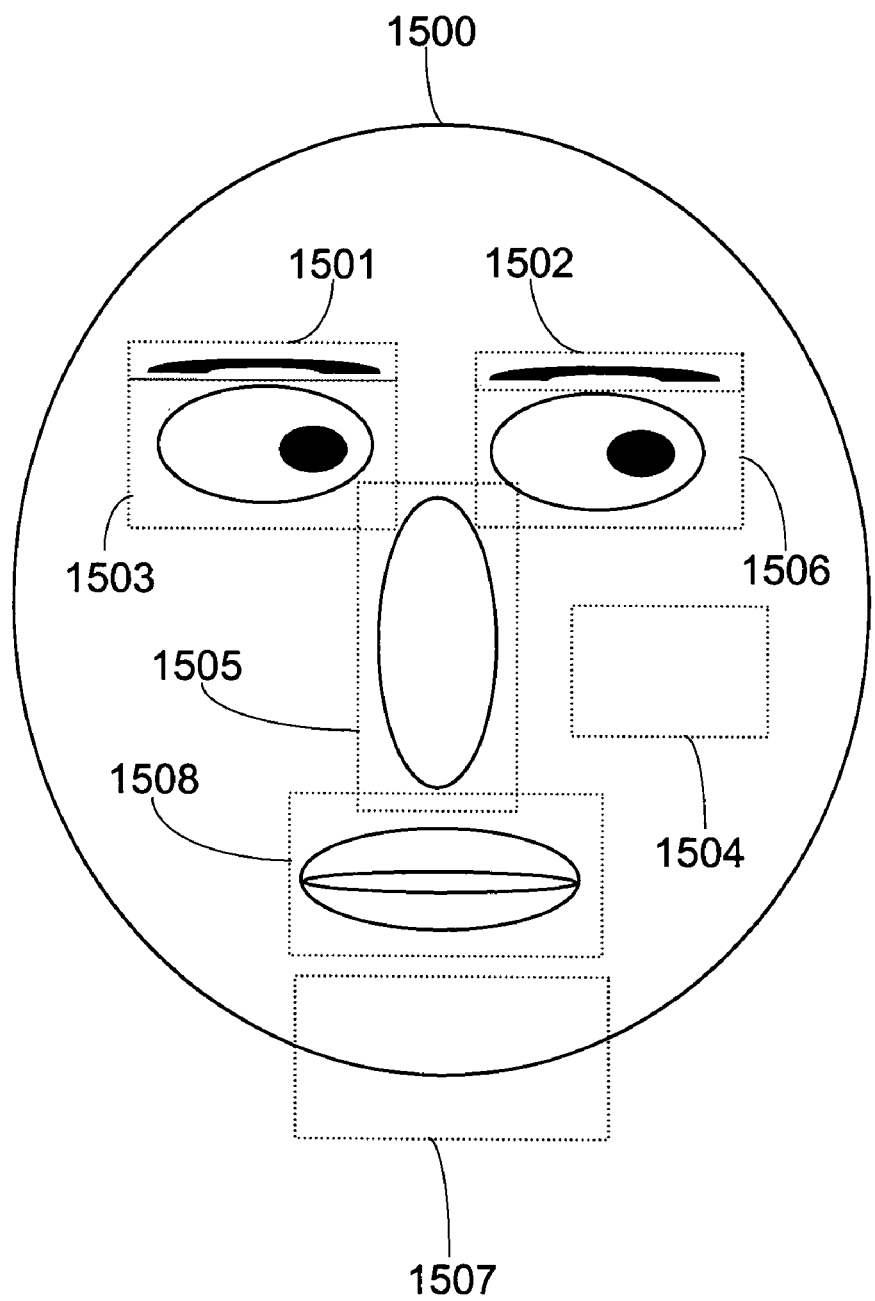

FIG. 15 shows an exemplary embodiment of the components used for Demographic Classification.

Figure 16:
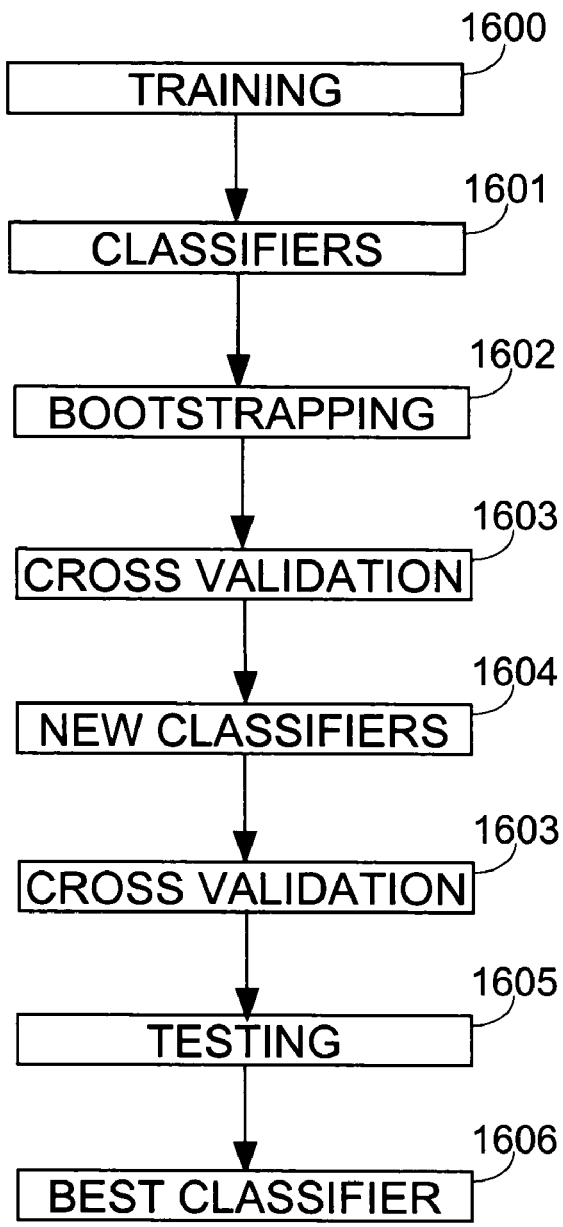

FIG. 16 shows the steps for training the classifiers.

DETAILED DESCRIPTION OF THE INVENTION

The envisioned system and method for demographic classification using components is described in detail in the following paragraphs.

Figure 1:
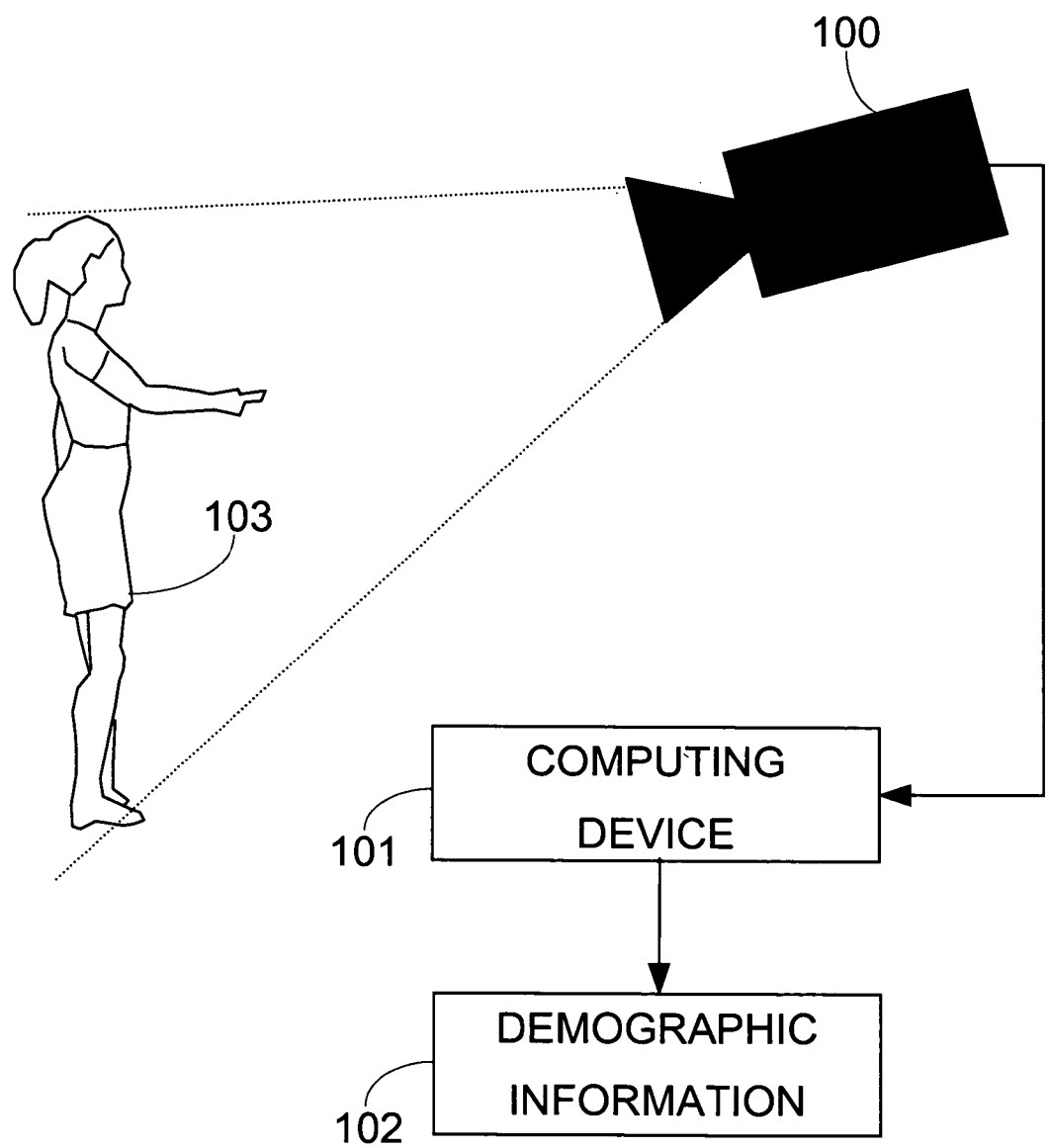
FIG. 1 shows the general setup of the system.
Figure 2:
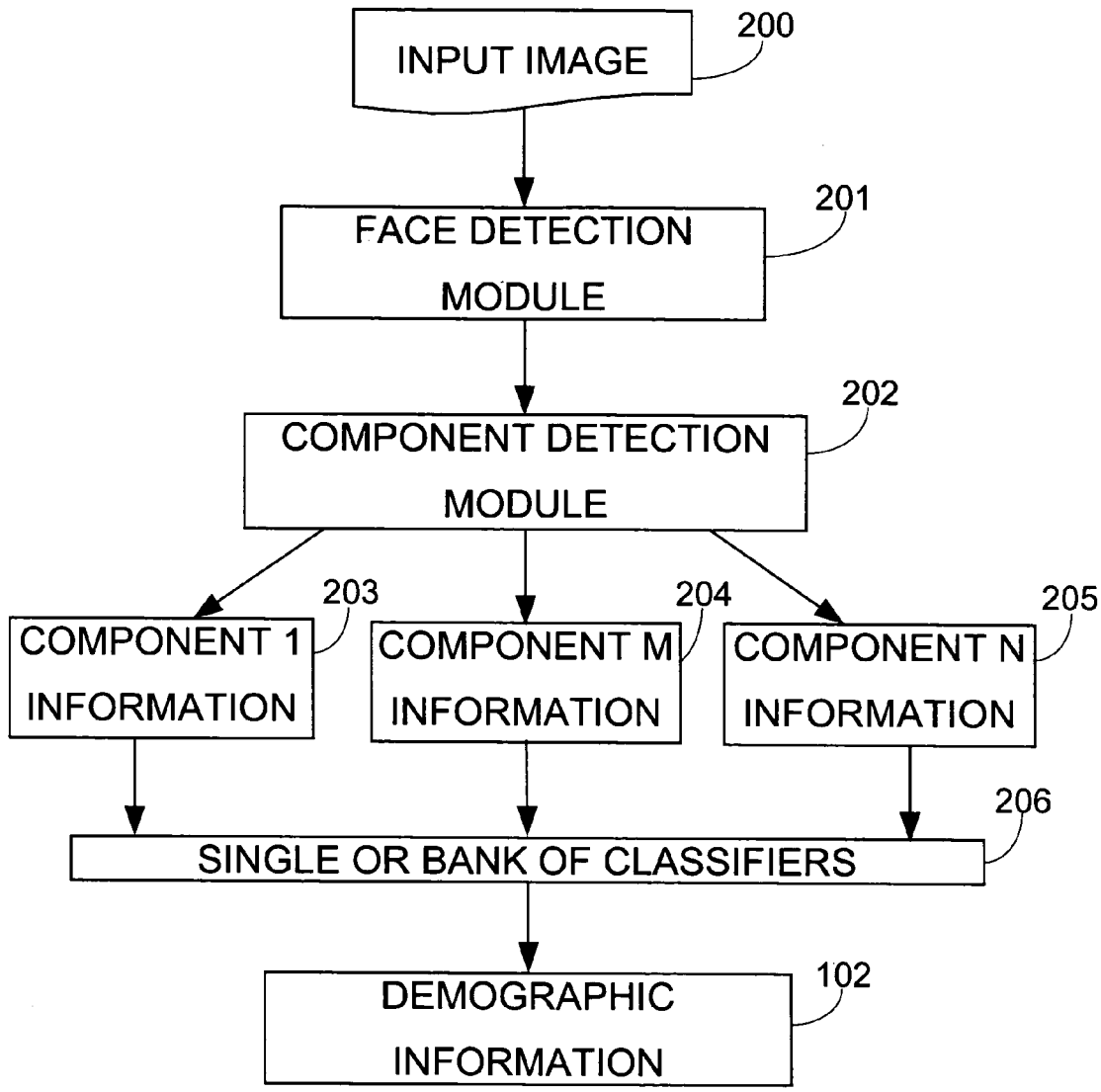
FIG. 2 shows the overview block diagram of the invention.

The proposed invention detects the faces in the current scene in an image and determines the demographic information 102 of the people. FIG. 1 shows the overall system setup that provides the hardware and application context for the present invention. The hardware, for the current exemplary embodiment, comprise of an image-capturing device 100 which acquires the image of a user 103 standing in front of the system and a computing device 101. Anybody familiar with the art would realize that other embodiments are also possible where the image-capturing device 100 is not necessary (for e.g., images from the Internet). In current embodiment, a PIII 864 Mhz, 512 MB RAM, 80 GB HDD was used as the computing device 101 and PYRO 1394 web cam by ADS technologies was used as image-capturing device 100.

In the current exemplary embodiment, the computer is fed with the digital image 200 of the scene. Face detection module 201 crops out the area of interest from the scene. The component detection module 202 (see FIG. 4) operates on the output of the face detection module 201. The component detection module 202 detects the components in the face image 304, extracts interesting features of each component, and generates the component information 203, 204, and 205. A demographic classifier is made on the component information 203, 204, and 205 by feeding it to single or bank of classifiers 206 to determine the demographics of the people in the image. All the modules are defined in more detail in the following paragraphs.

In FIG. 3, the face detection module 201 takes the input digital image 200 from the image-capturing device 100 and performs image-processing operations 300 (see FIG. 5). In an exemplary embodiment, image enhancement techniques 501, such as histogram equalization and contrast stretching are performed. The processed image is fed to a face detection algorithm 301. Face detection algorithm 301 detects the face and sends it to the face verification algorithm 302, which verifies the hypotheses of a face in a scene. Face localization 303 takes the output of face verification algorithm 302 and localizes on the face image 304. The face detection algorithm 301 as implemented in Henry A. Rowley, Shumeet Baluja, and Takeo Kanade, "Neural-Network-Based Face Detection", IEEE Transactions on Pattern Analysis and Machine Intelligence, 20(1), pp. 23-38, January 1998, could be used as the face detector algorithm. In the current embodiment, an Adaboost face detector cascaded with Neural Network based face detector was used for faster detection of face. The output of the face detection module 201 is a rectangular window containing the face of the people in the image. People conversant in the art will notice that other embodiments with respect to system hardware, image preprocessing, and choice of face detection algorithms are possible.

FIG. 5 shows an exemplary embodiment of preprocessing module. Preprocessing module is used for filtering the digital image to improve accuracy in image-processing operations 300, 700, 701, and 702. This module has Color Space Conversion 500, Image Enhancement techniques 501 such as Color Histogram, Brightness Correction, Contrast Stretching, etc. It also comprise of Pose Correction module 502, Rotation and Translation 503, Face Normalization 504 module. This module also transforms the image by Data Representation 505 techniques such as PCA, ICA, LNMF, etc. to generate Output Processed Image 506, which is used for face detection, component detection and classification. Image-processing operations 300, 700, 701, and 702 might not use all the blocks in FIG. 5 for preprocessing. In the current exemplary embodiment, preprocessing module converts the color image to grayscale image, applies histogram equalization and brightness correction, performs rotation and translation and PCA data representation to the digital image.

Components

This invention uses components for demographic classification. The classification algorithm and the choice of demographic class drive the choice of components. Components are defined as an artifact that is one of the individual parts of which a composite entity is made up. An exemplary embodiment of components is used in Pyush Agrawal and Rajeev Sharma, "Role of Image Components in Gender Classification", Masters Thesis, Pennsylvania State University, August 2003, wherein Left Eyebrow, Right Eyebrow, Left Eye, Right Eye, Both Eyes, Nose, and Mouth were used for gender classification. Another embodiment is shown in FIG. 15 where Left Eyebrow 1501, Right Eyebrow 1502, Left Eye 1503, Right Eye 1506, Nose 1505, Mouth 1508, Chin 1507, Skin color information 1504, and contour information 1500 of the face are used. Anyone conversant with the art would realize that there could be many more such embodiments.

FIG. 4 shows an exemplary embodiment of the component detection module 202. Component detection module 202 takes the face image 304 generated by face detection module 201 and performs more image-processing operations 300 for improved detection of components. Same or different preprocessing steps might be undertaken for each component detector 401, 402, and 403. The processed image is fed to the component detectors 400, 401, and 402 to locate the components in a face image. There may be multitude of component detectors to detect the different components in the image. The component detection algorithm as implemented in Antonio Colmenarez, Brendan Frey, and Thomas S. Huang, "Detection and Tracking of Faces and Facial Features", Proceedings on International Conference on Image Processing 1999, ICIP 99, Vol. 1, pp. 657-661, 1999, could be used. In the current exemplary embodiment, the component detector 400, 401, and 402 returns the size and location of the components in the face image. Other embodiments of component detectors are also possible.

Feature Extraction and Component Information

Before the image is fed to the classifiers, the component images are passed through a component feature extractor 403, 404, and 405 algorithm to generate component information 203, 204, and 205. Feature extraction is a very important part of the classification system. Many different methods such as Principal Component Analysis (PCA), Independent Component Analysis (ICA), Non-Negative Matrix Factorization (LNMF) etc. could be used depending on which kind of classification paradigm is being used. These different methods can thus be used to generate different classifiers. Furthermore, the component feature extractor 403, 404, and 405 may be used to locate other information within the feature like corner points, contours, gradient changes, etc. This representation of the image is finally fed to the classifier to extract the demographic information 102. In the current exemplary embodiment, image enhancement techniques such as histogram equalization, brightness gradient removal, and contrast stretching are applied to the grayscale images used for demographic classification. Feature extraction increases accuracy by removing redundant or misleading information within the image. Moreover, it also improves the computational speed of the classifiers, which forms an important aspect for any real time system.

FIG. 6 shows an exemplary embodiment of the component information 203, 204, and 205. The component information 203, 204, and 205 includes the component image 600, component features 602, component location & size 601, anthropometric ratios and measures within this component 603 and other features 604. Any or all of the component information 203, 204, and 205 is used for used for classification purposes. The current embodiment uses, the PCA image of the components, its location and size, and distance between and from facial components for classification. Another exemplary embodiment of component information 203, 204, and 205 is used in Pyush Agrawal and Rajeev Sharma, "Role of Image Components in Gender Classification", Masters Thesis, Pennsylvania State University, August 2003. Anyone conversant with the art would recognize that there could be other embodiments of the component information.

Training, Testing, and Bootstrapping Classifiers

FIG. 16 describes the steps is an exemplary case that could be followed for creating an accurate and generalized model classifier. In data collection facial images of people of different demographic groups were collected. All these images were appropriately labeled with the demographic categories of the person(s) in the image. These labels were used as ground truths to be used during the training of the classifiers. This data set was divided into three parts—the training 1600, the bootstrapping 1602, and the testing set 1605, all of them mutually disjoint. For the training 1600 step, about 75% of the data collected, from all the demographic categories was used. A method of cross validation could be used to get classifier 1601. The different parameters that could be changed are the classification algorithm, kernels, and the kernel parameters. Once the best classifier is found from the cross validation method 1603, the misclassified examples could be used in the bootstrapping 1602 process to further refine the classifier. In the bootstrapping process, about 10% to 50% of the misclassified images, are added to the training database to get a new classifier 1604. This new classifier 1604 is again tested with the bootstrapping images and the process is continued until the best classifier is obtained.

Classifier Fusion

The component information 203, 204, and 205 is used for making the demographic classifiers. Depending on the classifier fusion methodology followed, individual demographic classifiers may be made for each of the component information 203, 204, and 205. In this invention, two classifier fusion methodologies are proposed. The first is Data Level Fusion 704 and the second is Hierarchical Fusion 803 demographic classifier.

In case of Data Level Fusion 704, the component information 203, 204, and 205 from every component may be pre-processed 700, 701, and 702 (see FIG. 7) differently to improve the overall accuracy of data level fusion 704 classifier. The preprocessed component information 203, 204, and 205 is concatenated into a single vector 703. This vector is used for training, bootstrapping, and testing of Data Level Fusion 704 classifier. An exemplary embodiment of Data Level Fusion 704 is shown in Pyush Agrawal and Rajeev Sharma, "Role of Image Components in Gender Classification", Masters Thesis, Pennsylvania State University, August 2003.

The Hierarchical Fusion 803 model uses the classifier results from component demographic classifiers 800, 801, and 802 for training, bootstrapping, and testing the Hierarchical Fusion 803 classifier (see FIG. 8). The component information 203, 204, and 205 from each component may be preprocessed 701, 701, and 702 differently to improve the accuracy of each component demographic classifiers 800, 801, and 802. The preprocessed component information 203, 204, and 205 is used to create component demographic classifiers 800, 801, and 802. These component demographic classifier 800, 801, and 802 results are passed to multi-level classifiers called Hierarchical Fusion 803 classifier. The Hierarchical Fusion 803 classifier may perform fusion on the basis of Majority Voting, Support Vector Machine, Hidden Markov Model, Bayesian Networks, Neural Networks, CART, or any other technique available in the classification literature. In the current embodiment, this classification is performed using polynomial kernel based Support Vector Machines.

In order to improve the accuracy of demographic sub-category classification (such as male/female), the component demographic classifiers 800, 801, and 802 can be arranged in serial, parallel, or hybrid manner (see FIGS. 9, 10, 11, and 12). Furthermore, the demographic category classifier (such as age/ethnicity/gender) can also be arranged in serial/parallel/hybrid manner (see FIGS. 11, 12, 13, and 14) to increase the demographic classification accuracy.

In serial configuration of classifiers (see FIGS. 9 and 14), the classifiers are organized in cascade method. Hence, Demographic Classifier N 802, takes the output of previous classifiers to improve the accuracy and give Classifier Output 900. In parallel configuration of classifiers (see FIGS. 10 and 13), component demographic classifiers 800, 801, and 802 classify the component information 203, 204, and 205 in independent method. This classification output is fused together using Classifier Fusion 1000 to give Classifier Output 900. In hybrid configuration (see FIGS. 11 and 12), serial and parallel configuration is used in conjunction to improve the accuracy. FIG. 11 shows an exemplary embodiment of hybrid configuration where parallel configuration of a subset of component demographic classifiers 801 and 802 is used in conjunction with serial configuration of another subset of component demographic classifiers 804 and 805. In another exemplary embodiment (FIG. 12), serial configuration might be used before parallel configuration. People familiar with art would realize that there are many other possible configurations.

Sub-Category Demographic Classification

A particular exemplary case of ethnicity category classification could be a four-class ethnicity classifier based on SVM classification.

Similarly, gender category classification is a two-class classifier based on SVM. In current embodiment, the gender classifiers are cascaded after ethnicity, with different gender classifier for each ethnicity. So, in the current implementation, there are four different two-class gender classifiers. The gender classifier is selected on the basis of the ethnicity classifier. For each different four-gender classifier, the gender classifier is trained using images relevant to that particular ethnicity. For example, only Caucasian images are used for training, bootstrapping, and testing the Caucasian gender classifier.

Similarly, in the exemplary case of age category classification could be a five-class age classifier based on SVM classifier. In the current embodiment, the age classifier is cascaded after ethnicity classifier and gender classifier. So, there are eight different five-class age classifiers. Each different five-class age is associated with each ethnicity and gender. The five-age age classifier is selected on the basis of the output of the gender and ethnicity classifiers. For each of the eight age classifiers, the age classifier is trained using images relevant to that particular ethnicity and age. For e.g., only Caucasian Female images are used for training, bootstrapping, and testing the Caucasian Female age classifier.

Category Demographic Classification

In the current exemplary embodiment, only age, gender and ethnicity demographic categories were used. These categories demographic classifiers can be arranged in serial, parallel, or hybrid organization.

In FIG. 13, the demographic categories are arranged in parallel configuration. Age Classifier 1300, Gender Classifier 1301, and Ethnicity Classifier 1302 works independently and does not influence the Age Output 1303, Gender Output 1304, and Ethnicity Output 1305.

In FIG. 14, the demographic categories are arranged in serial configuration. Age/Gender/Ethnicity Classifiers 1400, 1401, and 1402 are demographic category classifiers and can be age, gender, or ethnicity. In this configuration the result of the classifiers are dependent on the previous classifier results.

Anyone, literate at the art would realize that this is not the only way of making the component demographic classifiers 800, 801, and 802. The component demographic classifiers 800, 801, and 802 can be arranged in serial, parallel, or hybrid manner (see FIGS. 9, 10, 11, and 12). Moreover, the demographic classifiers can also be arranged in serial/parallel/hybrid organization to improve the accuracy. Furthermore, the current exemplary embodiment uses SVM based classification algorithm. This classification algorithm can be substituted with existing classification algorithm or classification algorithm discovered in future. The current embodiment should not be treated as a restriction of the scope of this invention.

Support Vector Machine

In the current exemplary embodiment, the classification technique used is the support vector machines (SVM). This technology has several features that make it particularly attractive. Traditional training techniques for classifiers, such as multi-layer perceptions (MLP), use empirical risk minimization and only guarantee minimum error over the training set. In contrast, the SVM machinery uses structural risk minimization that minimizes a bound on the generalization error and therefore should perform better on novel data. Another interesting aspect of the SVM is that its decision surface depends only on the inner product of the feature vectors. This leads to an important extension since the Euclidean inner product can be replaces by any symmetric positive-definite kernel K(x,y). This use of kernel is equivalent to mapping the feature vectors to a high-dimensional space, thereby significantly increasing the discriminative power of the classifier.

EXAMPLE PREFERRED EMBODIMENTS

The attached appendix "Role of Image Components in Gender Classification", Pyush Agrawal and Rajeev Sharma, Masters Thesis, Pennsylvania State University, August 2003 describes one example of a preferred embodiment of the present invention, which is not limited in any way to the embodiment described in the Appendix.

What is claimed is:

1. A system for extracting demographic information using facial components comprising;
   a) means for detecting one or a plurality of face images from one or a plurality of input images,
   b) means for detecting facial components in the face images,
   c) means for extracting one or a plurality of facial component features from the facial components,
   d) means for automatically generating component information from the facial component features and the facial components, and
   e) means for processing the component information using classifiers including data level fusion classifiers and hierarchical fusion classifiers for demographic information identification,
   wherein the data level fusion classifiers concatenate preprocessed component information into a single vector,
   wherein the hierarchical fusion classifiers process results from component demographic classifiers,
   wherein the preprocessed component information from each component is preprocessed differently from each other to improve the accuracy of each component demographic classifier,
   wherein the demographic information comprises age, gender, or ethnicity,
   whereby said facial components are defined as artifacts that are individual parts of which a composite entity is made up, and
   whereby the input images are acquired from an image sensing device or internet.

2. The system according to claim 1, wherein said demographic information comprises one or a plurality of demographic categories that further comprises two or more demographic sub-categories,
   whereby of the demographic categories include age, gender, or ethnicity, and
   whereby the demographic sub-categories include male, female for the gender demographic category.

3. The system according to claim 1, wherein the classifiers comprise one or a plurality of demographic classifiers,
   wherein said demographic classifier comprises a combination of two or more:
   a) means for collecting data,
   wherein the data is divided into three mutually disjoint parts, including training set, bootstrapping set, and testing set,
   b) means for training of classifiers using cross validation,
   c) means for bootstrapping to obtain the best classifier, or
   d) means for testing classifiers using testing data,
   whereby generating best said one or a plurality of classifiers.

4. The system according to claim 1, wherein the system further comprises means for arranging the classifiers in serial, parallel, or hybrid organization, wherein in serial configuration of the classifiers, the classifiers are organized in a cascade method.

5. The system according to claim 1, wherein the classifiers comprise means for performing fusion by concatenating the component information for extracting said demographic information.

6. The system according to claim 1, wherein the classifiers comprise means for passing component demographic classifier results to the hierarchical fusion classifiers,
   wherein the hierarchical fusion classifiers are multi-level classifiers,
   wherein component information from each component may be preprocessed differently, and
   wherein the hierarchical fusion classifiers may perform fusion on the basis of Majority Voting, Support Vector Machine, Hidden Markov Model, Bayesian Networks, Neural Networks, CART, or any other technique available in the classification literature.

7. A method for extracting demographic information using facial components comprising steps of;
   a) detecting one or a plurality of face images from one or a plurality of input images,
   b) detecting facial components in the face images,
   c) extracting one or a plurality of facial component features from the facial components,
   d) automatically generating component information from the facial component features and the facial components, and e) processing the component information using classifiers including data level fusion classifiers and hierarchical fusion classifiers for demographic information identification, wherein the data level fusion classifiers concatenate preprocessed component information into a single vector, wherein the hierarchical fusion classifiers process results from component demographic classifiers, wherein the preprocessed component information from each component is preprocessed differently from each other to improve the accuracy of each component demographic classifier, wherein the demographic information comprises age, gender, or ethnicity, whereby said facial components are defined as artifacts that are individual parts of which a composite entity is made up, and whereby the input images are acquired from an image sensing device or internet.

8. The method according to claim 7, wherein said demographic information comprises one or a plurality of demographic categories that further comprises two or more demographic sub-categories, whereby the demographic categories include age, gender, or ethnicity, and whereby the demographic sub-categories include male, female for the gender demographic category.

9. The method according to claim 7, wherein the method further comprises a step of using one or a plurality of demographic classifiers, wherein said demographic classifier comprises a combination of two or more steps of a) data collection, wherein the data is divided into three mutually disjoint parts, including training set, bootstrapping set, and testing set, b) training of classifiers using cross validation, c) bootstrapping to obtain the best classifier, or d) testing classifiers using testing data, whereby generating best said one or a plurality of classifiers.

10. The method according to claim 7, wherein the method further comprises a step of arranging the classifiers in serial, parallel, or hybrid organization, wherein in serial configuration of the classifiers, the classifiers are organized in a cascade method.

11. The method according to claim 7, wherein the method further comprises a step of performing fusion by concatenating the component information for extracting said demographic information.

12. The method according to claim 7, wherein the method further comprises a step of passing component demographic classifier results to the hierarchical fusion classifiers, wherein the hierarchical fusion classifiers are multi-level classifiers, wherein component information from each component may be preprocessed differently, and wherein the hierarchical fusion classifiers may perform fusion on the basis of Majority Voting, Support Vector Machine, Hidden Markov Model, Bayesian Networks, Neural Networks, CART, or any other technique available in the classification literature.

* * * * *